(12) United States Patent
Kondo

(10) Patent No.: US 10,227,090 B2
(45) Date of Patent: Mar. 12, 2019

(54) HYDRAULIC DRIVE SYSTEM

(71) Applicant: KAWASAKI JUKOGYO KABUSHIKI KAISHA, Kobe-shi, Hyogo (JP)

(72) Inventor: Akihiro Kondo, Nishinomiya (JP)

(73) Assignee: KASAWAKI JUKOGYO KABUSHIKI KAISHA, Kobe-shi (JP)

( * ) Notice: Subject to any disclaimer, the term of this patent is extended or adjusted under 35 U.S.C. 154(b) by 209 days.

(21) Appl. No.: 15/374,546

(22) Filed: Dec. 9, 2016

(65) Prior Publication Data

US 2017/0166253 A1    Jun. 15, 2017

(30) Foreign Application Priority Data

Dec. 14, 2015  (JP) ................................. 2015-242951

(51) Int. Cl.
*B62D 11/00* (2006.01)
*B62D 11/04* (2006.01)
(Continued)

(52) U.S. Cl.
CPC ............ *B62D 11/005* (2013.01); *B62D 11/04* (2013.01); *E02F 9/226* (2013.01); *E02F 9/2267* (2013.01);
(Continued)

(58) Field of Classification Search
CPC ...... E02F 9/2221; E02F 9/2226; F15B 20/008
See application file for complete search history.

(56) References Cited

U.S. PATENT DOCUMENTS 5,295,795 A * 3/1994 Yasuda ................. E02F 9/2235
417/213
6,055,851 A * 5/2000 Tanaka ................. E02F 9/2235
73/40
(Continued)

FOREIGN PATENT DOCUMENTS

GB          2394318 A  *  4/2004  ............ E02F 9/2235
JP       2008-215420 A     9/2008
JP       2015-086958 A     5/2015

OTHER PUBLICATIONS

Dec. 21, 2017 Office Action issued in Chinese Patent Application No. 2016111456515.

*Primary Examiner* — Michael Leslie
*Assistant Examiner* — Matthew Wiblin
(74) *Attorney, Agent, or Firm* — Oliff PLC

(57) ABSTRACT

A hydraulic drive system includes: control valves; solenoid proportional valves outputting pilot pressures to the control valves; a controller controlling each of the solenoid proportional valves; a primary pressure line leading hydraulic oil from an auxiliary pump to the solenoid proportional valves; a solenoid switching valve provided on the primary pressure line; a movement detection line blocked when any of movement detection target control valves has moved; and a movement detection pressure sensor provided on the movement detection line. The controller controls the solenoid switching valve while all of operation devices are outputting electrical signals indicating that their operating levers are in neutral, such that: the solenoid switching valve opens the primary pressure line if a measurement value of the pressure sensor is less than a threshold; and the solenoid switching valve blocks the primary pressure line if the measurement value of the pressure sensor is greater than the threshold.

7 Claims, 9 Drawing Sheets

(51) Int. Cl.
*E02F 9/22* (2006.01)
*E02F 9/26* (2006.01)
*E02F 3/32* (2006.01)

(52) U.S. Cl.
CPC .......... *E02F 9/2285* (2013.01); *E02F 9/2292* (2013.01); *E02F 9/2296* (2013.01); *E02F 9/268* (2013.01); *B60Y 2400/85* (2013.01); *E02F 3/32* (2013.01)

(56) References Cited

U.S. PATENT DOCUMENTS

| | | | |
|---|---|---|---|
| 8,756,916 B2* | 6/2014 | Sato | E02F 9/2246 60/284 |
| 8,880,302 B1* | 11/2014 | Tachibana | F15B 21/02 60/459 |
| 2008/0264499 A1* | 10/2008 | Bacon | E02F 9/226 137/563 |
| 2010/0011757 A1* | 1/2010 | Satake | E02F 3/965 60/459 |
| 2013/0325235 A1* | 12/2013 | Kurikuma | E02F 9/207 701/22 |
| 2016/0252107 A1* | 9/2016 | Kondo | E02F 9/2235 60/428 |

* cited by examiner

HYDRAULIC DRIVE SYSTEM

BACKGROUND OF THE INVENTION

1. Field of the Invention

The present invention relates to a hydraulic drive system installed in, for example, construction machines.

2. Description of the Related Art

In a hydraulic drive system applied to an industrial machine, construction machine, or the like, hydraulic oil is supplied from a main pump to a plurality of hydraulic actuators. Specifically, a circulation line extends from the main pump to a tank, and a plurality of control valves are disposed on the circulation line. Each control valve controls hydraulic oil supply to and hydraulic oil discharge from a corresponding one of the actuators.

The control valves may be operated by pilot operation valves that output pilot pressures, or may be operated by operation devices that output electrical signals. In the latter case, generally speaking, each control valve receives pilot pressures outputted from a pair of solenoid proportional valves. For example, Japanese Laid-Open Patent Application Publication No. 2008-215420 discloses a hydraulic drive system 100 of a hydraulic excavator as shown in FIG. 9.

Specifically, in the hydraulic drive system 100, hydraulic oil is supplied from a main pump 110 to actuators 131 to 133 via control valves 121 to 123. Pairs of solenoid proportional valves (141, 142, and 143) output pilot pressures to the control valves 121, 122, and 123, respectively. Hydraulic oil from an auxiliary pump 150 is led to the solenoid proportional valves 141 and 142 through a first line 161. Hydraulic oil from the auxiliary pump 150 is also led to the solenoid proportional valves 143 through a second line 162.

The hydraulic drive system 100 adopts a configuration intended for handling failures of the solenoid proportional valves 141 to 143. (One of the valve failures to handle is, for example, any of the solenoid proportional valves getting stuck in the state of outputting a certain pilot pressure.)

Specifically, the first line 161 and the second line 162 are provided with a solenoid switching valve 171 and a solenoid switching valve 172, respectively. Among the pilot pressures outputted from the solenoid proportional valves 141 and 142, the highest pilot pressure is selected by high pressure selective valves 181 to 183, and the selected pilot pressure is measured by a pressure sensor 191. Similarly, a higher one of the pilot pressures outputted from the solenoid proportional valves 143 is selected by a high pressure selective valve 184, and the selected pilot pressure is measured by a pressure sensor 192. Then, if it is determined based on the measurement value of the pressure sensor 191 that a failure has occurred in the solenoid proportional valves 141 or 142, the solenoid switching valve 171 blocks the first line 161. If it is determined based on the measurement value of the pressure sensor 192 that a failure has occurred in the solenoid proportional valves 143, the solenoid switching valve 172 blocks the second line 162. In this manner, the supply of the hydraulic oil to the failed solenoid proportional valve(s) is stopped, and the control valve(s) corresponding to the failed solenoid proportional valve(s) is/are brought back to the neutral position.

SUMMARY OF THE INVENTION

However, the hydraulic drive system 100 shown in FIG. 9 requires the installation of a large number of high pressure selective valves in order to detect failures in the solenoid proportional valves. Thus, there is a problem of high cost.

In view of the above, an object of the present invention is to provide a hydraulic drive system capable of detecting failures in solenoid proportional valves with an inexpensive configuration, and when detecting such a failure, bringing the corresponding control valve back to the neutral position.

In order to solve the above-described problems, a hydraulic drive system according to one aspect of the present invention includes: a plurality of control valves disposed on a circulation line extending from a main pump to a tank; a plurality of operation devices with which to operate the plurality of control valves, each operation device including an operating lever and outputting an electrical signal in accordance with an inclination angle of the operating lever; a plurality of solenoid proportional valves that output pilot pressures to the plurality of control valves; a controller that controls each of the plurality of solenoid proportional valves based on the electrical signal outputted from a corresponding one of the plurality of operation devices; a primary pressure line that leads hydraulic oil from an auxiliary pump to the plurality of solenoid proportional valves; a solenoid switching valve provided on the primary pressure line; a movement detection line that extends from the auxiliary pump to the tank through a plurality of movement detection target control valves among the plurality of control valves, the movement detection line being blocked when any of the plurality of movement detection target control valves has moved; and a movement detection pressure sensor provided on the movement detection line. The controller controls the solenoid switching valve while all the plurality of operation devices are outputting electrical signals indicating that their operating levers are in neutral, such that: the solenoid switching valve opens the primary pressure line if a measurement value of the pressure sensor is less than a threshold; and the solenoid switching valve blocks the primary pressure line if the measurement value of the pressure sensor is greater than the threshold.

According to the above-described configuration, in a case where any of the solenoid proportional valves is getting stuck in the state of outputting a certain pilot pressure, even if all the operation devices are outputting electrical signals indicating that their operating levers are in neutral, the pressure of the movement detection line is high. As a result, the solenoid switching valve is controlled by the controller to block the primary pressure line. Therefore, when such a failure has occurred in a solenoid proportional valve, the control valve corresponding to the failed solenoid proportional valve can be brought back to the neutral position. Moreover, such a failure in a solenoid proportional valve can be detected by merely installing the movement detection line extending through the movement detection target control valves, i.e., by an inexpensive configuration.

The hydraulic drive system may be a hydraulic drive system of a self-propelled hydraulic excavator. The plurality of movement detection target control valves may include: a left running control valve disposed on a first circulation line extending from a first main pump to the tank; a right running control valve disposed on a second circulation line extending from a second main pump to the tank; and a plurality of non-running control valves, each of which is disposed either on the first circulation line or on the second circulation line. The plurality of operation devices may include: a plurality of running operation devices with which to operate the left running control valve and the right running control valve; and a plurality of non-running operation devices with which to operate the plurality of non-running control valves. The hydraulic drive system may include a plurality of the movement detection lines including: a first movement detection line that extends from the auxiliary pump to the tank through the left running control valve and the right running control valve, the first movement detection line being blocked when either the left running control valve or the right running control valve has moved; and a second movement detection line that extends from the auxiliary pump to the tank through the plurality of non-running control valves, the second movement detection line being blocked when any of the plurality of non-running control valves has moved. The plurality of solenoid proportional valves may include: a plurality of running operation solenoid proportional valves that output pilot pressures to the left running control valve and the right running control valve; and a plurality of non-running operation solenoid proportional valves that output pilot pressures to the plurality of non-running control valves. The primary pressure line may include: a running operation passage that leads the hydraulic oil from the auxiliary pump to the plurality of running operation solenoid proportional valves; and a non-running operation passage that leads the hydraulic oil from the auxiliary pump to the plurality of non-running operation solenoid proportional valves. The hydraulic drive system may include: a plurality of the solenoid switching valves including a first solenoid switching valve provided on the running operation passage and a second solenoid switching valve provided on the non-running operation passage; and a plurality of the movement detection pressure sensors including a first pressure sensor provided on the first movement detection line and a second pressure sensor provided on the second movement detection line. The controller may control the first solenoid switching valve while all the plurality of running operation devices are outputting electrical signals indicating that their operating levers are in neutral, such that: the first solenoid switching valve opens the running operation passage if a measurement value of the first pressure sensor is less than a first threshold; and the first solenoid switching valve blocks the running operation passage if the measurement value of the first pressure sensor is greater than the first threshold. The controller may control the second solenoid switching valve while all the plurality of non-running operation devices are outputting electrical signals indicating that their operating levers are in neutral, such that: the second solenoid switching valve opens the non-running operation passage if a measurement value of the second pressure sensor is less than a second threshold; and the second solenoid switching valve blocks the non-running operation passage if the measurement value of the second pressure sensor is greater than the second threshold. According to this configuration, a failure in the running operation solenoid proportional valves and a failure in the non-running operation solenoid proportional valves can be detected separately. In addition, even if a failure has occurred in the running operation solenoid proportional valves or the non-running operation solenoid proportional valves, either running actuators or non-running actuators can be kept driven.

In order to solve the above-described problems, a hydraulic drive system according to another aspect of the present invention includes: a plurality of control valves disposed on a circulation line extending from a main pump to a tank; a plurality of operation devices with which to operate the plurality of control valves, each operation device including an operating lever and outputting an electrical signal in accordance with an inclination angle of the operating lever; a plurality of solenoid proportional valves that output pilot pressures to the plurality of control valves; a controller that controls each of the plurality of solenoid proportional valves based on the electrical signal outputted from a corresponding one of the plurality of operation devices; a primary pressure line that leads hydraulic oil from an auxiliary pump to the plurality of solenoid proportional valves; a solenoid switching valve provided on the primary pressure line; and a discharge-pressure-measuring pressure sensor provided on the circulation line. The controller controls the solenoid switching valve while all the plurality of operation devices are outputting electrical signals indicating that their operating levers are in neutral, such that: the solenoid switching valve opens the primary pressure line if a measurement value of the pressure sensor is less than a threshold; and the solenoid switching valve blocks the primary pressure line if the measurement value of the pressure sensor is greater than the threshold.

According to the above configuration, in a case where any of the solenoid proportional valves is getting stuck in the state of outputting a certain pilot pressure, even if all the operation devices are outputting electrical signals indicating that their operating levers are in neutral, the discharge pressure of the main pump is high. As a result, the solenoid switching valve is controlled by the controller to block the primary pressure line. Therefore, when such a failure has occurred in a solenoid proportional valve, the control valve corresponding to the failed solenoid proportional valve can be brought back to the neutral position. Moreover, such a failure in a solenoid proportional valve can be detected by merely installing the discharge-pressure-measuring pressure sensor on the circulation line, i.e., by an inexpensive configuration.

The plurality of control valves may include: a plurality of first control valves disposed on a first circulation line extending from a first main pump to the tank; and a plurality of second control valves disposed on a second circulation line extending from a second main pump to the tank. The plurality of operation devices may include: a plurality of first operation devices with which to operate the plurality of first control valves; and a plurality of second operation devices with which to operate the plurality of second control valves. The plurality of solenoid proportional valves may include: a plurality of first solenoid proportional valves that output pilot pressures to the plurality of first control valves; and a plurality of second solenoid proportional valves that output pilot pressures to the plurality of second control valves. The primary pressure line may include: a first passage that leads the hydraulic oil from the auxiliary pump to the plurality of first solenoid proportional valves; and a second passage that leads the hydraulic oil from the auxiliary pump to the plurality of second solenoid proportional valves. The hydraulic drive system may include: a plurality of the solenoid switching valves including a first solenoid switching valve provided on the first passage and a second solenoid switching valve provided on the second passage; and a plurality of the discharge-pressure-measuring pressure sensors including a first pressure sensor provided on the first circulation line and a second pressure sensor provided on the second circulation line. The controller may control the first solenoid switching valve while all the plurality of first operation devices are outputting electrical signals indicating that their operating levers are in neutral, such that: the first solenoid switching valve opens the first passage if a measurement value of the first pressure sensor is less than a first threshold; and the first solenoid switching valve blocks the first passage if the measurement value of the first pressure sensor is greater than the first threshold. The controller may control the second solenoid switching valve while all the plurality of second operation devices are outputting electrical signals indicating that their operating levers are in neutral, such that: the second solenoid switching valve opens the second passage if a measurement value of the second pressure sensor is less than a second threshold; and the second solenoid switching valve blocks the second passage if the measurement value of the second pressure sensor is greater than the second threshold. According to this configuration, a failure in the first solenoid proportional valves and a failure in the second solenoid proportional valves can be detected separately. In addition, even if a failure has occurred in the first solenoid proportional valves or the second solenoid proportional valves, either the actuators supplied with the hydraulic oil from the first main pump or the actuators supplied with the hydraulic oil from the second main pump can be kept driven.

The hydraulic drive system may be a hydraulic drive system of a self-propelled hydraulic excavator. The plurality of control valves may include: a left running control valve disposed on a first circulation line extending from a first main pump to the tank; a right running control valve disposed on a second circulation line extending from a second main pump to the tank; a plurality of first control valves that are control valves disposed on the first circulation line other than the left running control valve; and a plurality of second control valves that are control valves disposed on the second circulation line other than the right running control valve. The plurality of operation devices may include: a plurality of first operation devices with which to operate the plurality of first control valves; a plurality of second operation devices with which to operate the plurality of second control valves; and a plurality of running operation devices with which to operate the left running control valve and the right running control valve. The plurality of solenoid proportional valves may include: a plurality of first solenoid proportional valves that output pilot pressures to the plurality of first control valves; a plurality of second solenoid proportional valves that output pilot pressures to the plurality of second control valves; and a plurality of running operation solenoid proportional valves that output pilot pressures to the left running control valve and the right running control valve. The primary pressure line may include: a first passage that leads the hydraulic oil from the auxiliary pump to the plurality of first solenoid proportional valves; a second passage that leads the hydraulic oil from the auxiliary pump to the plurality of second solenoid proportional valves; and a running operation passage that leads the hydraulic oil from the auxiliary pump to the plurality of running operation solenoid proportional valves. The hydraulic drive system may include: a plurality of the solenoid switching valves including a first solenoid switching valve provided on the first passage, a second solenoid switching valve provided on the second passage, and a third solenoid switching valve provided on the running operation passage; a plurality of the discharge-pressure-measuring pressure sensors including a first pressure sensor provided on the first circulation line and a second pressure sensor provided on the second circulation line; a movement detection line that extends from the auxiliary pump to the tank through the left running control valve and the right running control valve, the movement detection line being blocked when either the left running control valve or the right running control valve has moved; and a third pressure sensor provided on the movement detection line. The controller may control the first solenoid switching valve while all the plurality of first operation devices are outputting electrical signals indicating that their operating levers are in neutral, such that: the first solenoid switching valve opens the first passage if a measurement value of the first pressure sensor is less than a first threshold; and the first solenoid switching valve blocks the first passage if the measurement value of the first pressure sensor is greater than the first threshold. The controller may control the second solenoid switching valve while all the plurality of second operation devices are outputting electrical signals indicating that their operating levers are in neutral, such that: the second solenoid switching valve opens the second passage if a measurement value of the second pressure sensor is less than a second threshold; and the second solenoid switching valve blocks the second passage if the measurement value of the second pressure sensor is greater than the second threshold. The controller may control the third solenoid switching valve while all the plurality of running operation devices are outputting electrical signals indicating that their operating levers are in neutral, such that: the third solenoid switching valve opens the running operation passage if a measurement value of the third pressure sensor is less than a third threshold; and the third solenoid switching valve blocks the running operation passage if the measurement value of the third pressure sensor is greater than the third threshold. According to this configuration, a failure in the first solenoid proportional valves, a failure in the second solenoid proportional valves, and a failure in the running operation solenoid proportional valves can be detected separately. In addition, even if a failure has occurred in the first solenoid proportional valves, the second solenoid proportional valves, or the running operation solenoid proportional valves, either the actuators supplied with the hydraulic oil from the first main pump or the actuators supplied with the hydraulic oil from the second main pump can be kept driven, or alternatively, either running actuators or non-running actuators can be kept driven.

The plurality of solenoid proportional valves may be normally closed valves. According to this configuration, if an electrical interruption has occurred, pilot pressures applied to the control valves can be made zero.

According to the present invention, failures in solenoid proportional valves can be detected with an inexpensive configuration, and when such a failure is detected, the corresponding control valve can be brought back to the neutral position.

The above and further objects, features, and advantages of the present invention will more fully be apparent from the following detailed description of embodiments with accompanying drawings.

DESCRIPTION OF THE PREFERRED EMBODIMENTS

Embodiment 1

Figure 1:
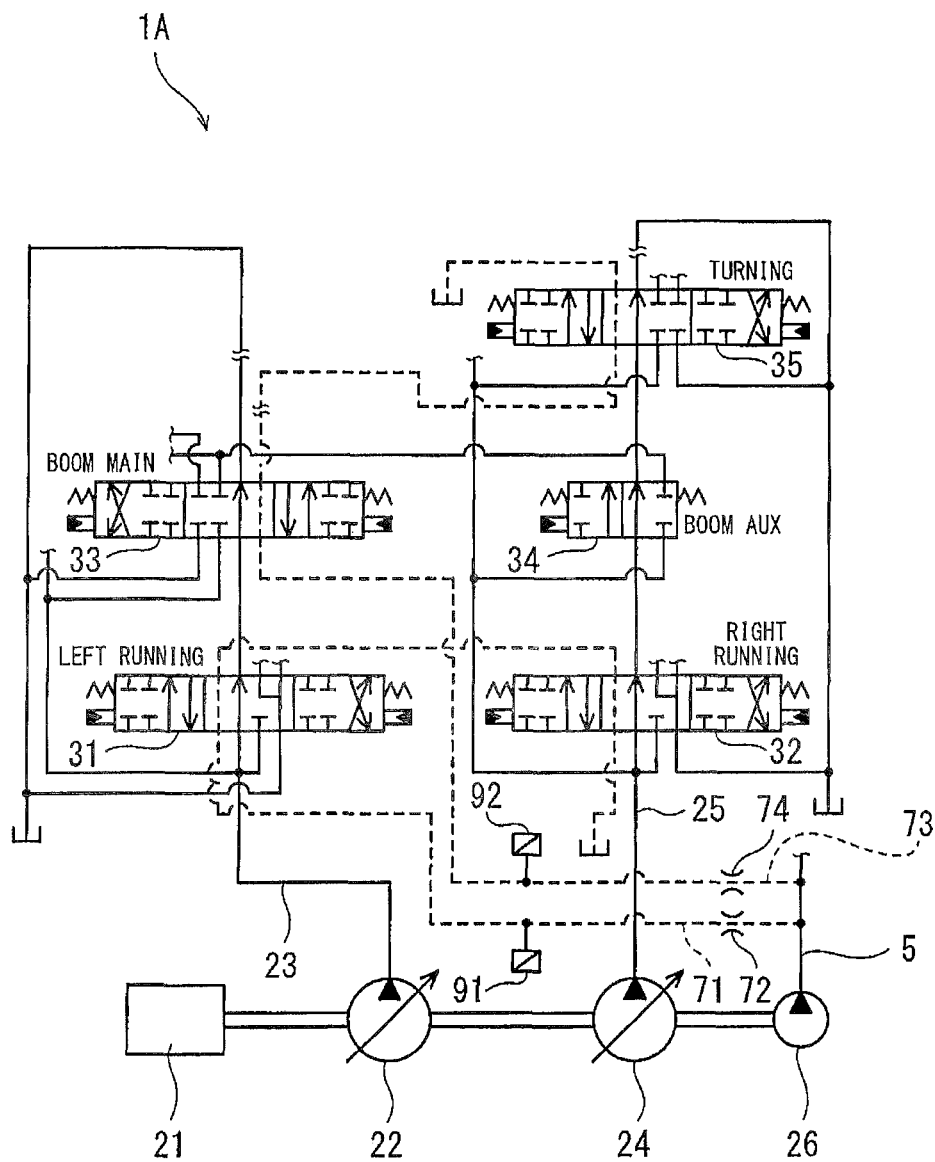
FIG. 1 is a main circuit diagram of a hydraulic drive system according to Embodiment 1 of the present invention.
Figure 2:
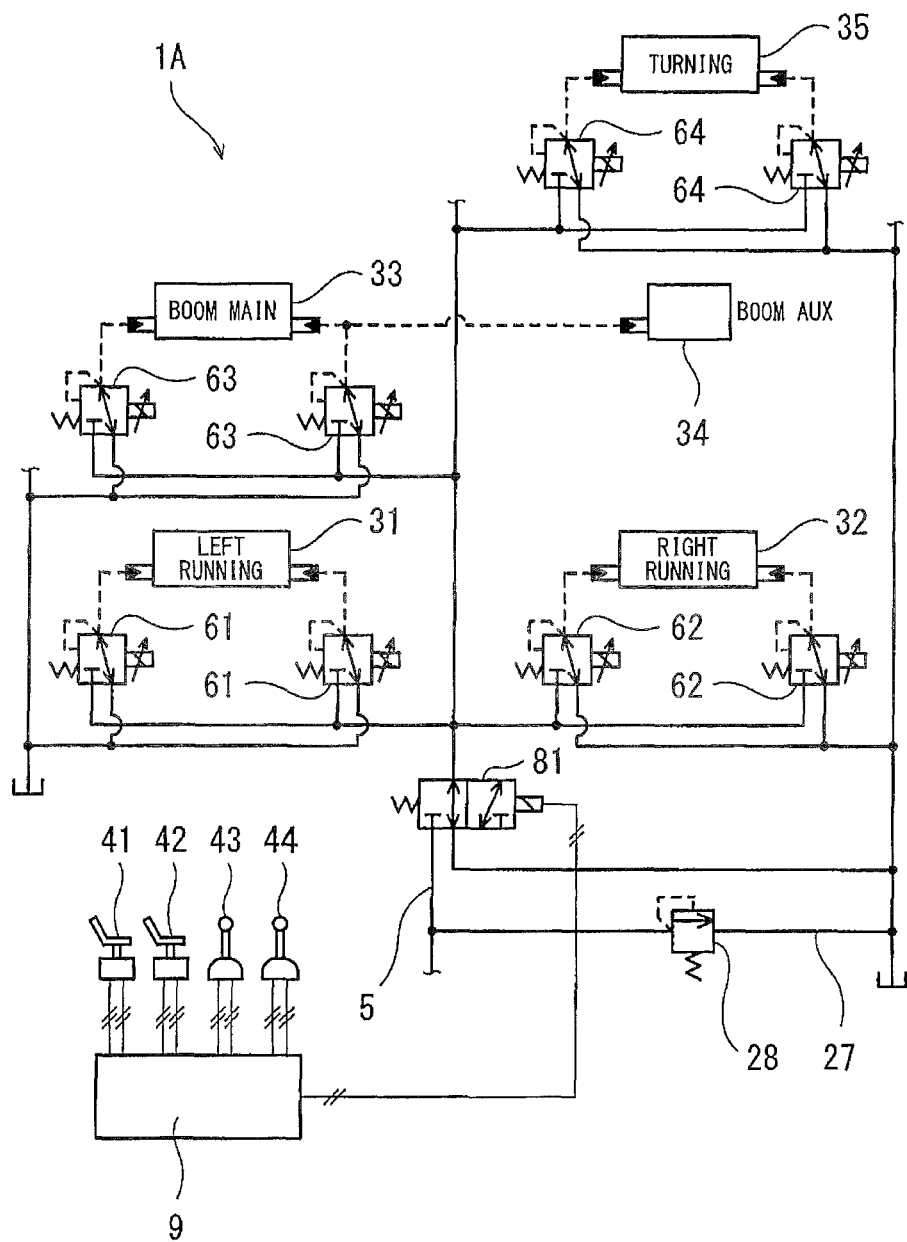
FIG. 2 is an operation circuit diagram of the hydraulic drive system according to Embodiment 1.

FIG. 1 and FIG. 2 show a hydraulic drive system 1A according to Embodiment 1 of the present invention. In the present embodiment, the hydraulic drive system 1A is a hydraulic drive system of a self-propelled hydraulic excavator 10 shown in FIG. 3.

Figure 3:
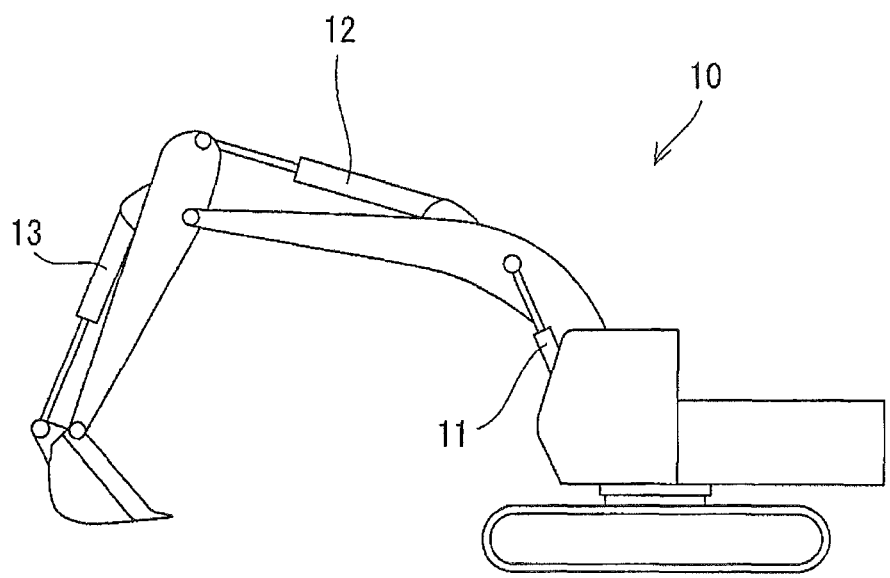
FIG. 3 is a side view of a hydraulic excavator that is one example of a construction machine.

Specifically, the hydraulic drive system 1A includes, as hydraulic actuators, a boom cylinder 11, an arm cylinder 12, and a bucket cylinder 13, which are shown in FIG. 3, and a turning motor, a left running motor, and a right running motor, which are not shown. A first main pump 22 and a second main pump 24 shown in FIG. 1 supply hydraulic oil to these actuators. The first main pump 22 and the second main pump 24 are driven by an engine 21. The engine 21 also drives an auxiliary pump 26.

As shown in FIG. 1, a first circulation line 23 extends from the first main pump 22 to a tank. A left running control valve 31 and a boom main control valve 33 are disposed on the first circulation line 23. Although not illustrated, an arm auxiliary control valve and a bucket control valve are also disposed on the first circulation line 23.

Similarly, a second circulation line 25 extends from the second main pump 24 to the tank. A right running control valve 32, a boom auxiliary control valve 34, and a turning control valve 35 are disposed on the second circulation line 25. Although not illustrated, an arm main control valve is also disposed on the second circulation line.

The left running control valve 31 controls hydraulic oil supply to and hydraulic oil discharge from the left running motor (not shown), and the right running control valve 32 controls hydraulic oil supply to and hydraulic oil discharge from the right running motor (not shown). The turning control valve 35 controls hydraulic oil supply to and hydraulic oil discharge from the turning motor (not shown), and the bucket control valve (not shown) controls hydraulic oil supply to and hydraulic oil discharge from the bucket cylinder 13. The boom main control valve 33 controls hydraulic oil supply to and hydraulic oil discharge from the boom cylinder 11, and the arm main control valve (not shown) controls hydraulic oil supply to and hydraulic oil discharge from the arm cylinder 12. At the time of boom raising, the boom auxiliary control valve 34 causes the hydraulic oil from the second main pump 24 to merge with the hydraulic oil supplied from the first main pump 22 to the boom cylinder 11. At the time of arm pushing and at the time of arm crowding, the arm auxiliary control valve (not shown) causes the hydraulic oil from the first main pump 22 to merge with the hydraulic oil supplied from the second main pump 24 to the arm cylinder 12.

As shown in FIG. 2, the hydraulic drive system 1A includes: a first running operation device 41 with which to operate the left running control valve 31; a second running operation device 42 with which to operate the right running control valve 32; a boom operation device 43 with which to operate the boom main control valve 33; and a turning operation device 44 with which to operate the turning control valve 35. Although not illustrated, the hydraulic drive system 1A further includes: an arm operation device with which to operate the arm main control valve; and a bucket operation device with which to operate the bucket control valve. The boom operation device 43, the turning operation device 44, the unillustrated arm operation device, and the unillustrated bucket operation device correspond to non-running operation devices of the present invention. Each operation device includes an operating lever, and outputs an electrical signal in accordance with an inclination angle of the operating lever to a controller 9. In the present embodiment, each operation device outputs an electrical signal to the controller 9 even when its operating lever is in neutral.

A pair of first running operation solenoid proportional valves 61 outputs pilot pressures to the left running control valve 31. A pair of second running operation solenoid proportional valves 62 outputs pilot pressures to the right running control valve 32. A pair of boom operation solenoid proportional valves 63 outputs pilot pressures to the boom main control valve 33. A pair of turning operation solenoid proportional valves 64 outputs pilot pressures to the turning control valve 35. Although not illustrated, a pair of arm operation solenoid proportional valves outputs pilot pressures to the arm main control valve, and a pair of bucket operation solenoid proportional valves outputs pilot pressures to the bucket control valve. The boom operation solenoid proportional valves 63, the turning operation solenoid proportional valves 64, the unillustrated arm operation solenoid proportional valves, and the unillustrated bucket operation solenoid proportional valves correspond to non-running operation solenoid proportional valves of the present invention.

In the present embodiment, the pilot port of the boom auxiliary control valve 34 is connected to the boom-raising pilot port of the boom main control valve 33. One of the boom operation solenoid proportional valves 63 outputs a pilot pressure also to the boom auxiliary control valve 34. Although not illustrated, a pair of pilot ports of the arm auxiliary control valve is connected to a pair of pilot ports of the arm main control valve. Both the arm operation solenoid proportional valves output pilot pressures also to the arm auxiliary control valve.

In the present embodiment, all the solenoid proportional valves are normally closed valves. However, as an alternative, all the solenoid proportional valves may be normally open valves.

The hydraulic oil from the auxiliary pump 26 is led to all the solenoid proportional valves through a primary pressure line 5. To be more specific, the primary pressure line 5 includes one common passage and a plurality of distribution passages branching off from the common passage.

Based on electrical signals outputted from all the operation devices, the aforementioned controller 9 controls the solenoid proportional valves. In particular, the controller 9 controls one or the other first running operation solenoid proportional valve 61 based on an electrical signal outputted from the first running operation device 41, controls one or the other second running operation solenoid proportional valve 62 based on an electrical signal outputted from the second running operation device 42, controls one or the other boom operation solenoid proportional valve 63 based on an electrical signal outputted from the boom operation device 43, and controls one or the other turning operation solenoid proportional valve 64 based on an electrical signal outputted from the turning operation device 44.

The common passage of the primary pressure line 5 is provided with a solenoid switching valve 81. A relief line 27 branches off from the common passage of the primary pressure line 5 at a position upstream of the solenoid switching valve 81. The relief line 27 is connected to the tank, and is provided with a relief valve 28.

Among the above control valves, the control valves other than the boom auxiliary control valve 34 and the arm auxiliary control valve (not shown) correspond to movement detection target control valves of the present invention. Also, the turning control valve 35, the boom main control valve 33, the unillustrated bucket control valve, and the unillustrated arm main control valve correspond to non-running control valves among the movement detection target control valves of the present invention.

As shown in FIG. 1, the hydraulic drive system 1A further includes a first movement detection line 71 and a second movement detection line 73. The first movement detection line 71 extends from the auxiliary pump 26 to the tank through the left running control valve 31 and the right running control valve 32. The upstream-side portion of the first movement detection line 71 forms a passage shared with the primary pressure line 5. The first movement detection line 71 may extend through the left running control valve 31 and the right running control valve 32 in any order. The first movement detection line 71 is configured to be blocked when either the left running control valve 31 or the right running control valve 32 has moved. The first movement detection line 71 is provided with a throttle 72 and a first pressure sensor (a movement detection pressure sensor) 91, which are disposed upstream of all the control valves on the first movement detection line 71, such that the throttle 72 is positioned upstream of the first pressure sensor 91. The throttle 72 serves to secure the pressure of the primary pressure line 5 when all the control valves on the first movement detection line 71 are in neutral. The first pressure sensor 91 measures the pressure of the first movement detection line 71 at a position downstream of the throttle 72.

The second movement detection line 73 extends from the auxiliary pump 26 to the tank through the boom main control valve 33, the arm main control valve (not shown), the bucket control valve (not shown), and the turning control valve 35. The upstream-side portion of the second movement detection line 73 forms a passage shared with the primary pressure line 5. The second movement detection line 73 may extend through the boom main control valve 33, the arm main control valve (not shown), the bucket control valve (not shown), and the turning control valve 35 in any order. The second movement detection line 73 is configured to be blocked when any one of the boom main control valve 33, the arm main control valve (not shown), the bucket control valve (not shown), and the turning control valve 35 has moved. The second movement detection line 73 is provided with a throttle 74 and a second pressure sensor (a movement detection pressure sensor) 92, which are disposed upstream of all the control valves on the second movement detection line 73, such that the throttle 74 is positioned upstream of the second pressure sensor 92. The throttle 74 serves to secure the pressure of the primary pressure line 5 when all the control valves on the second movement detection line 73 are in neutral. The second pressure sensor 92 measures the pressure of the second movement detection line 73 at a position downstream of the throttle 74.

The solenoid switching valve 81 shown in FIG. 2 is controlled by the controller 9. In the present embodiment, the solenoid switching valve 81 is a normally closed valve. To be more specific, while the solenoid switching valve 81 is receiving no driving current from the controller 9, the solenoid switching valve 81 cuts off the upstream-side portion of the common passage of the primary pressure line 5 from the downstream-side portion thereof, and brings the downstream-side portion of the common passage of the primary pressure line 5 into communication with the tank, by utilizing the urging force of a spring. On the other hand, while the solenoid switching valve 81 is receiving a driving current fed from the controller 9, the solenoid switching valve 81 brings the upstream-side portion of the common passage of the primary pressure line 5 into communication with the downstream-side portion thereof. It should be noted that the solenoid switching valve 81 may be a normally open valve. However, in order to improve safety, it is preferable that the solenoid switching valve 81 be a normally closed valve.

While any of the operation devices is outputting an electrical signal indicating that its operating lever is in a non-neutral state (i.e., indicating that the operating lever is not in neutral), the controller 9 feeds a driving current to the solenoid switching valve 81. As a result, the solenoid switching valve 81 opens the primary pressure line 5. That is, the upstream and downstream of the primary pressure line 5 are brought into communication with each other. While all the operation devices are outputting electrical signals indicating that their operating levers are in neutral, the controller 9 feeds a driving current to the solenoid switching valve 81 if the measurement value of the first pressure sensor 91 and the measurement value of the second pressure sensor 92 are both less than a threshold α (e.g., 0.2 to 0.5 MPa). On the other hand, while all the operation devices are outputting electrical signals indicating that their operating levers are in neutral, the controller 9 feeds no driving current to the solenoid switching valve 81 if at least one of the measurement value of the first pressure sensor 91 and the measurement value of the second pressure sensor 92 is greater than the threshold α. As a result, the solenoid switching valve 81 blocks the primary pressure line 5.

As described above, in the hydraulic drive system 1A according to the present embodiment, in a case where any of the solenoid proportional valves is getting stuck in the state of outputting a certain pilot pressure, even if all the operation devices are outputting electrical signals indicating that their operating levers are in neutral, the pressure of the first movement detection line 71 or the second movement detection line 73 is high. As a result, the solenoid switching valve 81 is controlled by the controller 9 to block the primary pressure line 5. Therefore, when such a failure has occurred in a solenoid proportional valve, the control valve corresponding to the failed solenoid proportional valve can be brought back to the neutral position. Moreover, such a failure in a solenoid proportional valve can be detected by merely installing the first movement detection line 71 and the second movement detection line 73 extending through the movement detection target control valves, i.e., by an inexpensive configuration.

Furthermore, since all the solenoid proportional valves are normally closed valves, if an electrical interruption has occurred, pilot pressures applied to the control valves can be made zero. This makes it possible to assuredly prevent unintended action of actuators.

<Variations>

In the above-described embodiment, each of the first movement detection line 71 and the second movement detection line 73 is provided with a pressure sensor. However, by using high pressure selective valves, the number of pressure sensors can be reduced to 1.

Moreover, a movement detection line extending through all the movement detection target control valves may be provided instead of the first movement detection line 71 and the second movement detection line 73. Furthermore, a single main pump may be provided instead of the first main pump 22 and the second main pump 24. In this case, all the control valves may be movement detection target control valves.

Embodiment 2

Figure 4:
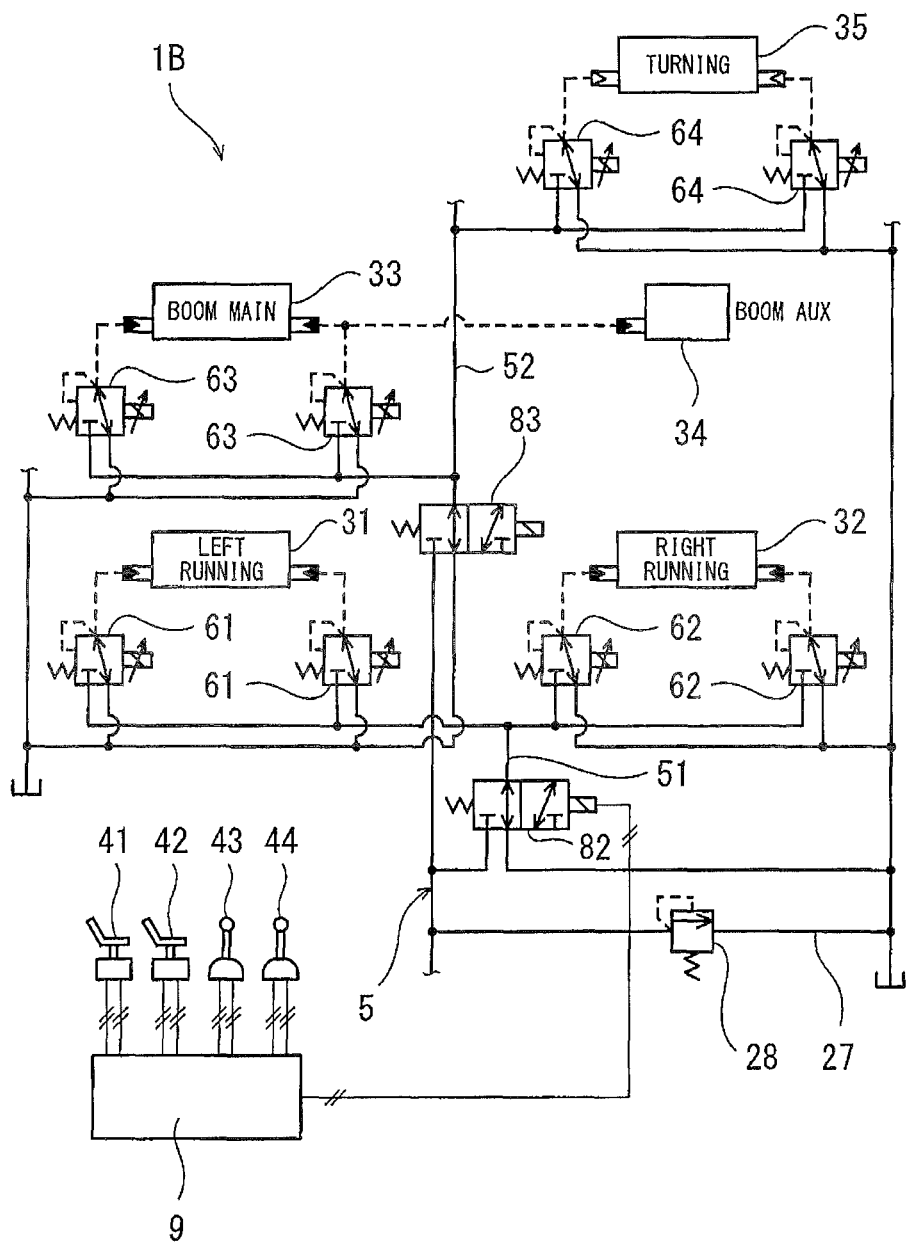
FIG. 4 is an operation circuit diagram of a hydraulic drive system according to Embodiment 2 of the present invention.

Next, a hydraulic drive system 1B according to Embodiment 2 of the present invention is described with reference to FIG. 4. It should be noted that, in the present embodiment and Embodiments 3 to 5 described below, the same components as those described in Embodiment 1 are denoted by the same reference signs as those used in Embodiment 1, and repeating the same descriptions is avoided below.

In the present embodiment, the main circuit of the hydraulic drive system 1B is the same as the main circuit shown in FIG. 1, and only the operation circuit thereof is different from that described in Embodiment 1. Specifically, the primary pressure line 5 includes: a running operation passage 51, which leads the hydraulic oil from the auxiliary pump 26 to the first running operation solenoid proportional valves 61 and the second running operation solenoid proportional valves 62; and a non-running operation passage 52, which leads the hydraulic oil from the auxiliary pump 26 to the following non-running operation solenoid proportional valves: the boom operation solenoid proportional valves 63; the turning operation solenoid proportional valves 64; the arm operation solenoid proportional valves (not shown); and the bucket operation solenoid proportional valves (not shown).

The upstream-side portion of the running operation passage 51 forms a passage shared with the upstream-side portion of the non-running operation passage 52. Each of the running operation passage 51 and the non-running operation passage 52 includes one common passage and a plurality of distribution passages branching off from the common passage.

The common passage of the running operation passage 51 is provided with a first solenoid switching valve 82, and the common passage of the non-running operation passage 52 is provided with a second solenoid switching valve 83. Each of the first solenoid switching valve 82 and the second solenoid switching valve 83 is configured in the same manner as the solenoid switching valve 81 described in Embodiment 1. The first solenoid switching valve 82 and the second solenoid switching valve 83 are controlled by the controller 9.

Regarding the first solenoid switching valve 82, while either the first running operation device 41 or the second running operation device 42 is outputting an electrical signal indicating that its operating lever is not in neutral, the controller 9 feeds a driving current to the first solenoid switching valve 82. As a result, the first solenoid switching valve 82 opens the running operation passage 51. While both the first running operation device 41 and the second running operation device 42 are outputting electrical signals indicating that their operating levers are in neutral, the controller 9 feeds a driving current to the first solenoid switching valve 82 if the measurement value of the first pressure sensor 91 is less than a first threshold $\alpha 1$. On the other hand, while both the first running operation device 41 and the second running operation device 42 are outputting electrical signals indicating that their operating levers are in neutral, the controller 9 feeds no driving current to the first solenoid switching valve 82 if the measurement value of the first pressure sensor 91 is greater than the first threshold $\alpha 1$. As a result, the first solenoid switching valve 82 blocks the running operation passage 51.

Regarding the second solenoid switching valve 83, while any of the non-running operation devices (i.e., any of the following valves: the boom operation device 43, the turning operation device 44, the unillustrated arm operation device, and the unillustrated bucket operation device) is outputting an electrical signal indicating that its operating lever is not in neutral, the controller 9 feeds a driving current to the second solenoid switching valve 83. As a result, the second solenoid switching valve 83 opens the non-running operation passage 52. While all the non-running operation devices are outputting electrical signals indicating that their operating levers are in neutral, the controller 9 feeds a driving current to the second solenoid switching valve 83 if the measurement value of the second pressure sensor 92 is less than a second threshold $\alpha 2$. On the other hand, while all the non-running operation devices are outputting electrical signals indicating that their operating levers are in neutral, the controller 9 feeds no driving current to the second solenoid switching valve 83 if the measurement value of the second pressure sensor 92 is greater than the second threshold $\alpha 2$. As a result, the second solenoid switching valve 83 blocks the non-running operation passage 52. It should be noted that the second threshold $\alpha 2$ may be the same as or different from the first threshold $\alpha 1$.

The present embodiment provides the same advantageous effects as those provided by Embodiment 1. Further, in the present embodiment, a failure in the running operation solenoid proportional valves and a failure in the non-running operation solenoid proportional valves can be detected separately. In addition, even if a failure has occurred in the running operation solenoid proportional valves or the non-running operation solenoid proportional valves, either running actuators (i.e., the running motors) or non-running actuators can be kept driven.

Embodiment 3

Figure 5:
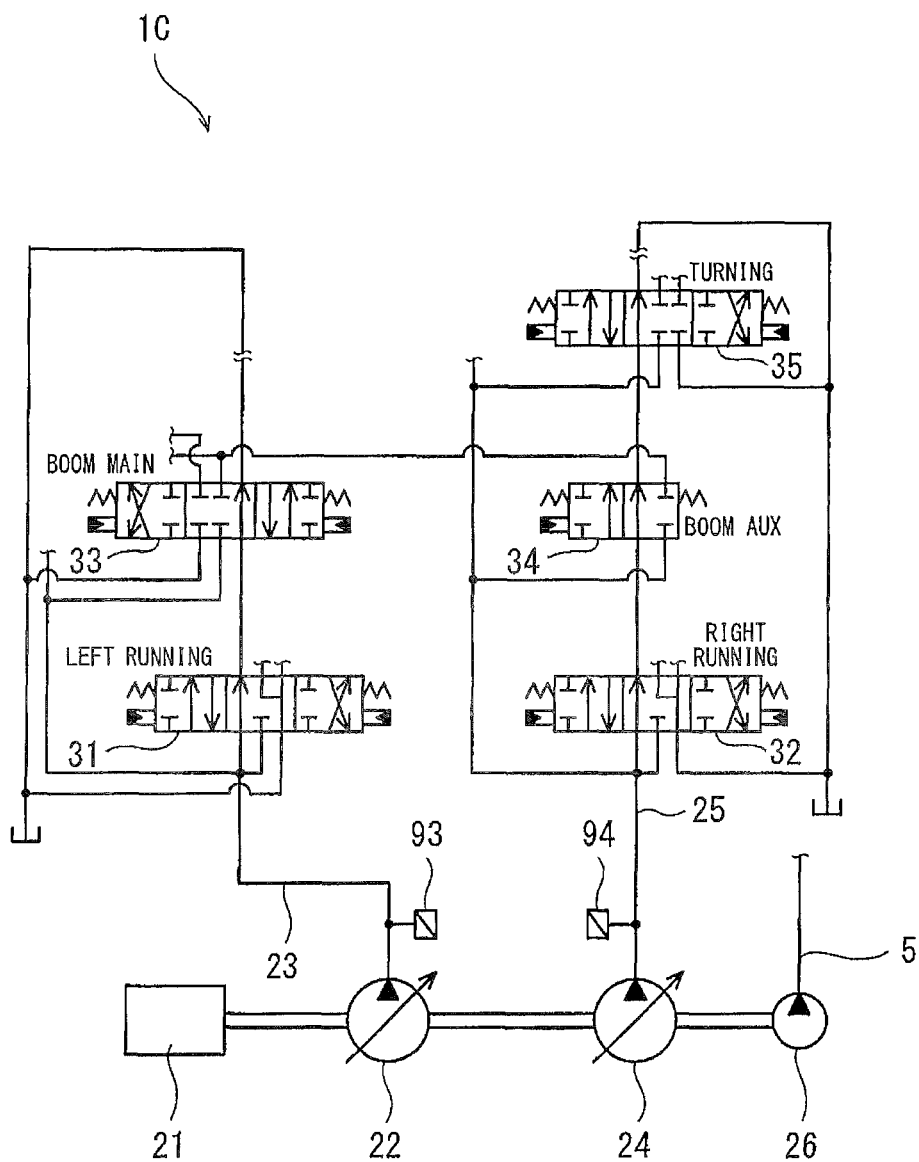
FIG. 5 is a main circuit diagram of a hydraulic drive system according to Embodiment 3 of the present invention.

Next, with reference to FIG. 5, a hydraulic drive system 1C according to Embodiment 3 of the present invention is described.

In the present embodiment, the operation circuit of the hydraulic drive system 1C is the same as the operation circuit shown in FIG. 2, and only the main circuit thereof is different from that described in Embodiment 1. Specifically, the present embodiment does not include the first movement detection line 71 and the second movement detection line 73. Instead, the first circulation line 23 is provided with a first pressure sensor (a discharge-pressure-measuring pressure sensor) 93, and the second circulation line 25 is provided with a second pressure sensor (a discharge-pressure-measuring pressure sensor) 94. The first pressure sensor 93 measures the discharge pressure of the first main pump 22, and the second pressure sensor 94 measures the discharge pressure of the second main pump 24.

While any of the operation devices is outputting an electrical signal indicating that its operating lever is not in neutral, the controller 9 feeds a driving current to the solenoid switching valve 81. As a result, the solenoid switching valve 81 opens the primary pressure line 5. While all the operation devices are outputting electrical signals indicating that their operating levers are in neutral, the controller 9 feeds a driving current to the solenoid switching valve 81 if the measurement value of the first pressure sensor 93 and the measurement value of the second pressure sensor 94 are both less than a threshold $\beta$ (e.g., 0.5 MPa). On the other hand, while all the operation devices are outputting electrical signals indicating that their operating levers are in neutral, the controller 9 feeds no driving current to the solenoid switching valve 81 if at least one of the measurement value of the first pressure sensor 93 and the measurement value of the second pressure sensor 94 is greater than the threshold β. As a result, the solenoid switching valve 81 blocks the primary pressure line 5.

As described above, in the hydraulic drive system 1C according to the present embodiment, in a case where any of the solenoid proportional valves is getting stuck in the state of outputting a certain pilot pressure, even if all the operation devices are outputting electrical signals indicating that their operating levers are in neutral, the discharge pressure of the first main pump 22 or the second main pump 24 is high. As a result, the solenoid switching valve 81 is controlled by the controller 9 to block the primary pressure line 5. Therefore, when such a failure has occurred in a solenoid proportional valve, the control valve corresponding to the failed solenoid proportional valve can be brought back to the neutral position. Moreover, such a failure in a solenoid proportional valve can be detected by merely installing the discharge-pressure-measuring pressure sensors on the first circulation line 23 and the second circulation line 25, i.e., by an inexpensive configuration.

Furthermore, since all the solenoid proportional valves are normally closed valves, if an electrical interruption has occurred, pilot pressures applied to the control valves can be made zero. This makes it possible to assuredly prevent unintended action of actuators.

<Variations>

A single main pump may be provided instead of the first main pump 22 and the second main pump 24. In this case, all the control valves may be movement detection target control valves.

Embodiment 4

Figure 6:
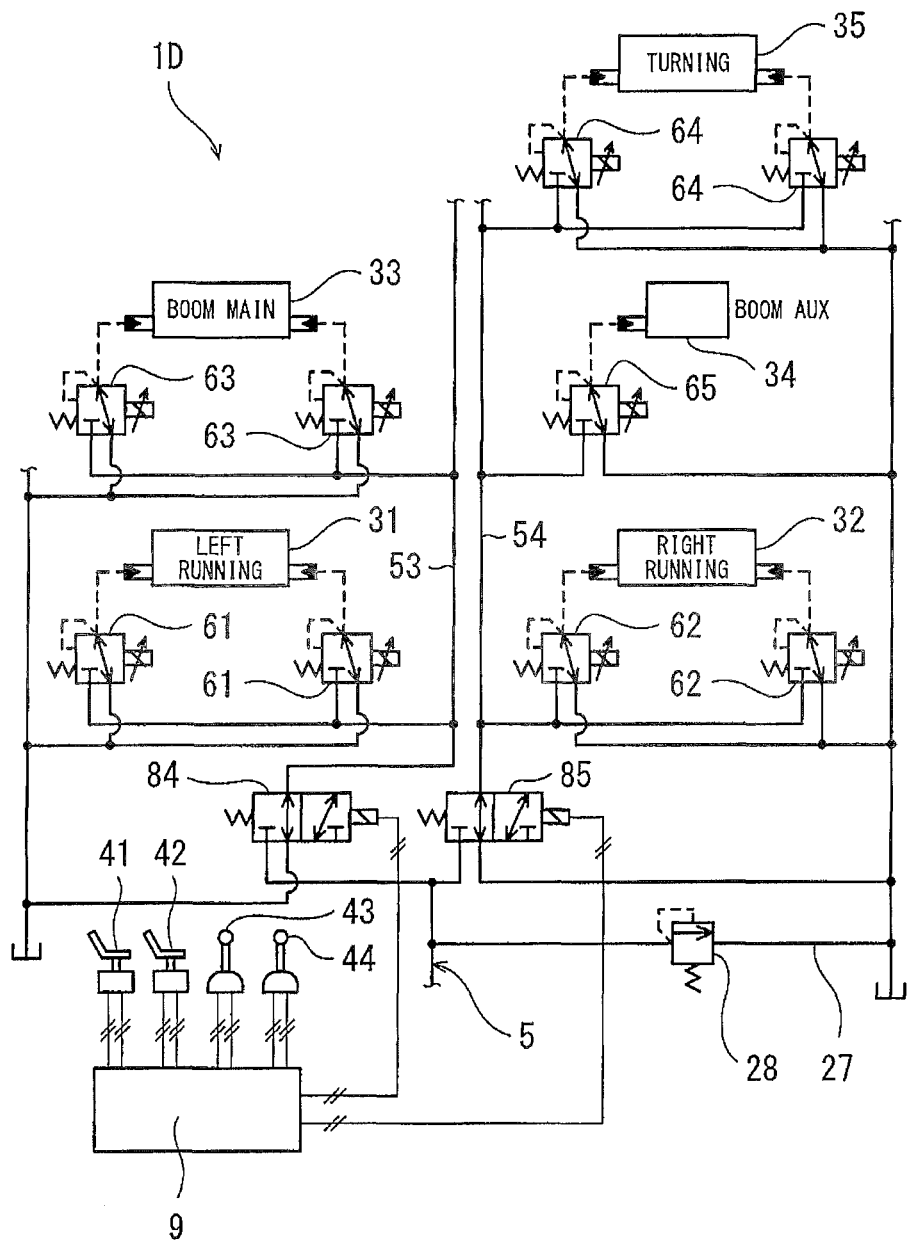
FIG. 6 is an operation circuit diagram of a hydraulic drive system according to Embodiment 4 of the present invention.

Next, a hydraulic drive system 1D according to Embodiment 4 of the present invention is described with reference to FIG. 6.

In the present embodiment, the main circuit of the hydraulic drive system 1D is the same as the main circuit shown in FIG. 5, and only the operation circuit thereof is different from that described in Embodiment 3. Further, in the present embodiment, the left running control valve 31, the boom main control valve 33, the arm auxiliary control valve (not shown), and the bucket control valve (not shown) disposed on the first circulation line 23 are categorized as first control valves, and also, the right running control valve 32, the boom auxiliary control valve 34, the turning control valve 35, and the arm main control valve (not shown) disposed on the second circulation line 25 are categorized as second control valves.

Still further, the first running operation device 41 and the bucket operation device (not shown) are categorized as first operation devices with which to operate the first control valves, and also, the second running operation device 42 and the turning operation device 44 are categorized as second operation devices with which to operate the second control valves. It should be noted that the boom operation device 43 and the arm operation device (not shown) serve as both first operation devices and second operation devices.

In Embodiment 1 (FIG. 2), the pilot port of the boom auxiliary control valve 34 is connected to the boom-raising pilot port of the boom main control valve 33. However, in the present embodiment, the pilot port of the boom auxiliary control valve 34 is connected to a boom auxiliary solenoid proportional valve 65 provided independently of the boom operation solenoid proportional valves 63. Similarly, although not illustrated, in Embodiment 1, the pair of pilot ports of the arm auxiliary control valve is connected to the pair of pilot ports of the arm main control valve; however, in the present embodiment, the pair of pilot ports of the arm auxiliary control valve is connected to a pair of arm auxiliary solenoid proportional valves provided independently of the arm operation solenoid proportional valves.

The first running operation solenoid proportional valves 61, the boom operation solenoid proportional valves 63, the arm auxiliary solenoid proportional valves (not shown), and the bucket operation solenoid proportional valves (not shown) are categorized as first solenoid proportional valves outputting pilot pressures to the first control valves. The second running operation solenoid proportional valves 62, the boom auxiliary solenoid proportional valve 65, the turning operation solenoid proportional valves 64, and the arm operation solenoid proportional valves (not shown) are categorized as second solenoid proportional valves outputting pilot pressures to the second control valves.

The primary pressure line 5 includes: a first passage 53, which leads the hydraulic oil from the auxiliary pump 26 to the first solenoid proportional valves (the first running operation solenoid proportional valves 61, the boom operation solenoid proportional valves 63, the unillustrated arm auxiliary solenoid proportional valves, and the unillustrated bucket operation solenoid proportional valves); and a second passage 54, which leads the hydraulic oil from the auxiliary pump 26 to the second solenoid proportional valves (the second running operation solenoid proportional valves 62, the boom auxiliary solenoid proportional valve 65, the turning operation solenoid proportional valves 64, and the unillustrated arm operation solenoid proportional valves).

The upstream-side portion of the first passage 53 forms a passage shared with the upstream-side portion of the second passage 54. Each of the first passage 53 and the second passage 54 includes one common passage and a plurality of distribution passages branching off from the common passage.

The common passage of the first passage 53 is provided with a first solenoid switching valve 84, and the common passage of the second passage 54 is provided with a second solenoid switching valve 85. Each of the first solenoid switching valve 84 and the second solenoid switching valve 85 is configured in the same manner as the solenoid switching valve 81 described in Embodiment 1. The first solenoid switching valve 84 and the second solenoid switching valve 85 are controlled by the controller 9.

Regarding the first solenoid switching valve 84, while any of the first operation devices is outputting an electrical signal indicating that its operating lever is not in neutral, the controller 9 feeds a driving current to the first solenoid switching valve 84. As a result, the first solenoid switching valve 84 opens the first passage 53. While all the first operation devices are outputting electrical signals indicating that their operating levers are in neutral, the controller 9 feeds a driving current to the first solenoid switching valve 84 if the measurement value of the first pressure sensor 93 is less than a first threshold β1. On the other hand, while all the first operation devices are outputting electrical signals indicating that their operating levers are in neutral, the controller 9 feeds no driving current to the first solenoid switching valve 84 if the measurement value of the first pressure sensor 93 is greater than the first threshold β1. As a result, the first solenoid switching valve 84 blocks the first passage 53.

Regarding the second solenoid switching valve 85, while any of the second operation devices is outputting an electrical signal indicating that its operating lever is not in neutral, the controller 9 feeds a driving current to the second solenoid switching valve 85. As a result, the second solenoid switching valve 85 opens the second passage 54. While all the second operation devices are outputting electrical signals indicating that their operating levers are in neutral, the controller 9 feeds a driving current to the second solenoid switching valve 85 if the measurement value of the second pressure sensor 94 is less than a second threshold β2. On the other hand, while all the second operation devices are outputting electrical signals indicating that their operating levers are in neutral, the controller 9 feeds no driving current to the second solenoid switching valve 85 if the measurement value of the second pressure sensor 94 is greater than the second threshold β2. As a result, the second solenoid switching valve 85 blocks the second passage 54. It should be noted that the second threshold β2 may be the same as or different from the first threshold β1.

The present embodiment provides the same advantageous effects as those provided by Embodiment 3. Further, in the present embodiment, a failure in the first solenoid proportional valves and a failure in the second solenoid proportional valves can be detected separately. In addition, even if a failure has occurred in the first solenoid proportional valves or the second solenoid proportional valves, either the actuators supplied with the hydraulic oil from the first main pump 22 or the actuators supplied with the hydraulic oil from the second main pump 24 can be kept driven.

<Variations>

The hydraulic drive system 1D according to the present embodiment is particularly suitable for use in a non-self-propelled hydraulic excavator mounted on a ship or the like. That is, it is not necessary for the hydraulic drive system 1D to include the left running control valve 31, the right running control valve 32, and the running operation devices 41 and 42.

Embodiment 5

Next, a hydraulic drive system 1E according to Embodiment 5 of the present invention is described with reference to FIG. 7 and FIG. 8.

Figure 7:
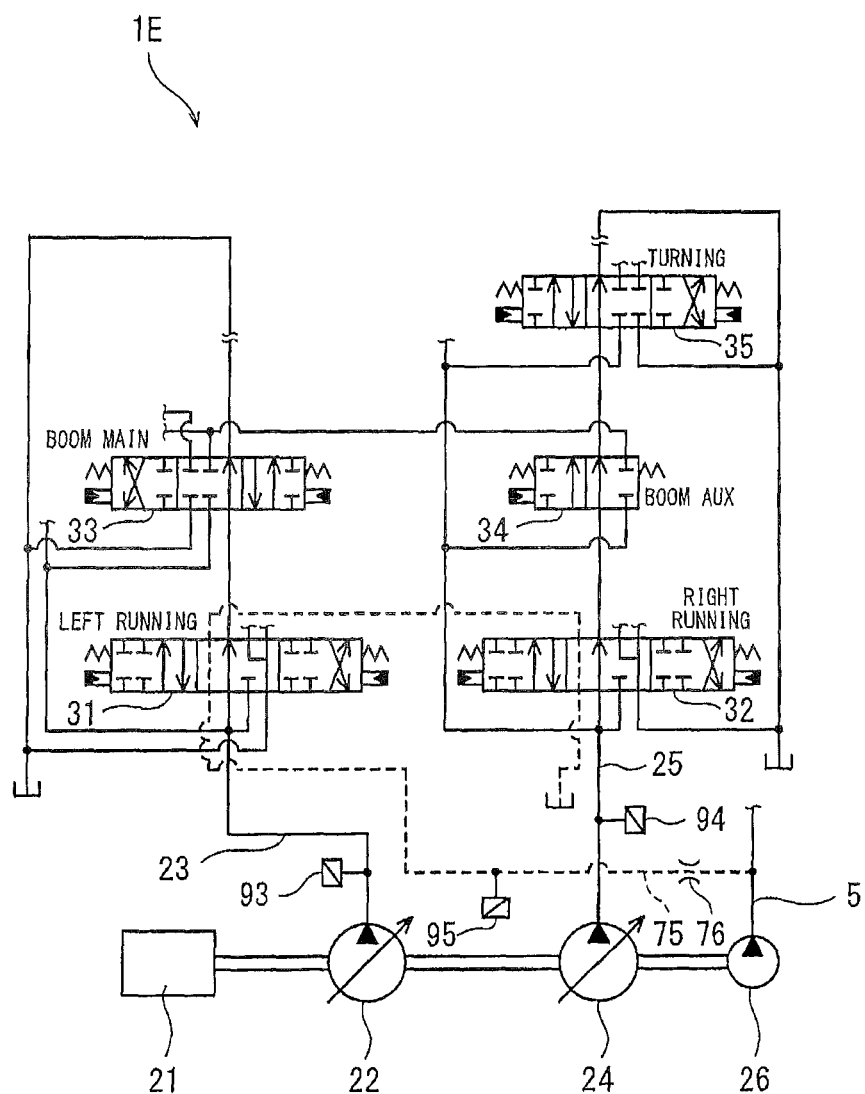
FIG. 7 is a main circuit diagram of a hydraulic drive system according to Embodiment 5 of the present invention.

As shown in FIG. 7, the hydraulic drive system 1E according to the present embodiment includes a main circuit that is a result of adding a movement detection line 75 to the hydraulic drive system 1C shown in FIG. 5. In the present embodiment, the control valves disposed on the first circulation line 23 other than the left running control valve 31 (i.e., the boom main control valve 33, the unillustrated arm auxiliary control valve, and the unillustrated bucket control valve) are categorized as first control valves, and also, the control valves disposed on the second circulation line 25 other than the right running control valve 32 (i.e., the boom auxiliary control valve 34, the turning control valve 35, and the unillustrated arm main control valve) are categorized as second control valves.

Further, the bucket operation device is categorized as one of the first operation devices with which to operate the first control valves, and also, the turning operation device 44 is categorized as one of the second operation devices with which to operate the second control valves. It should be noted that the boom operation device 43 and the arm operation device (not shown) serve as both first operation devices and second operation devices.

Figure 8:
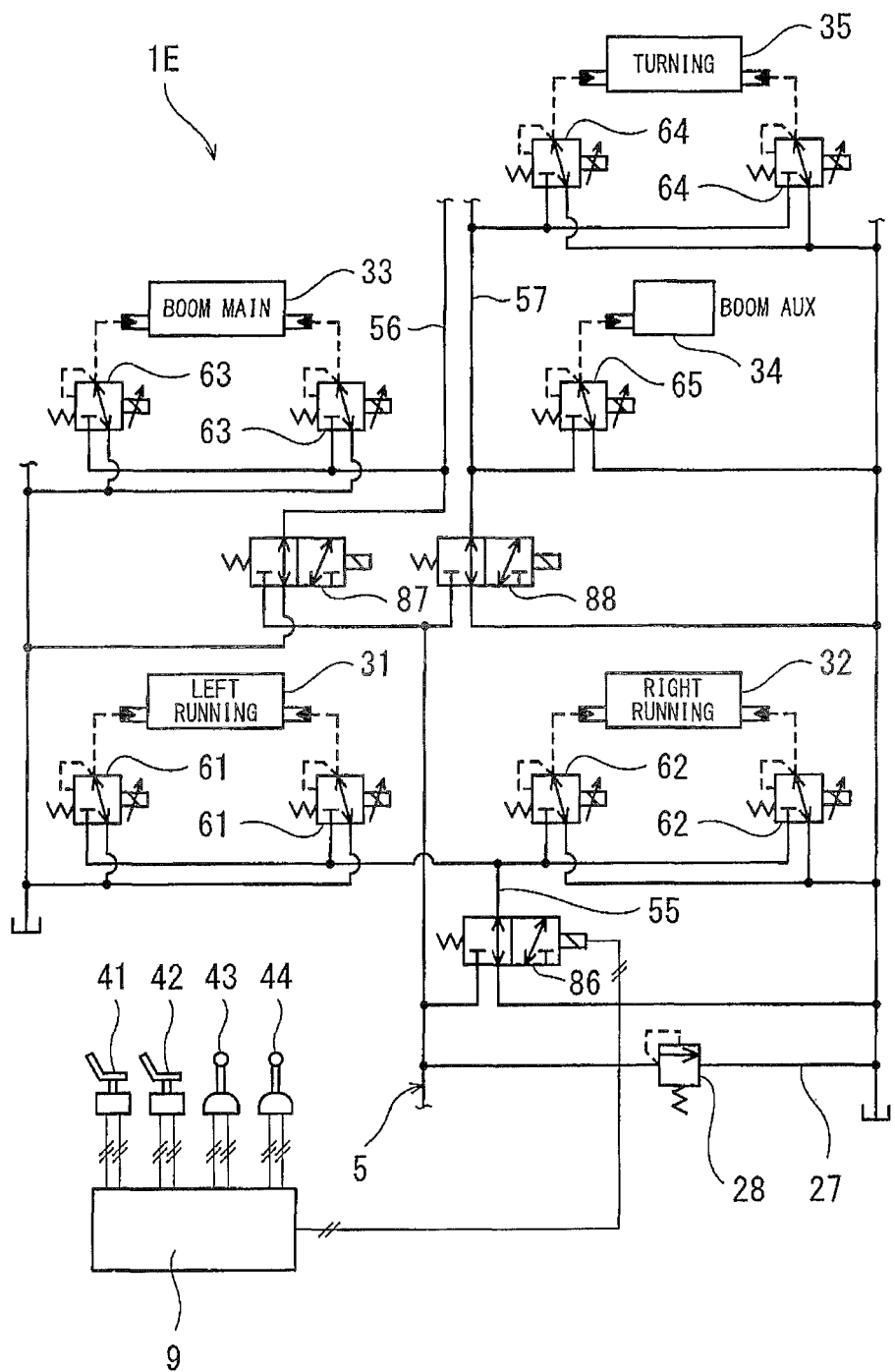
FIG. 8 is an operation circuit diagram of a hydraulic drive system according to Embodiment 5.
Figure 9:
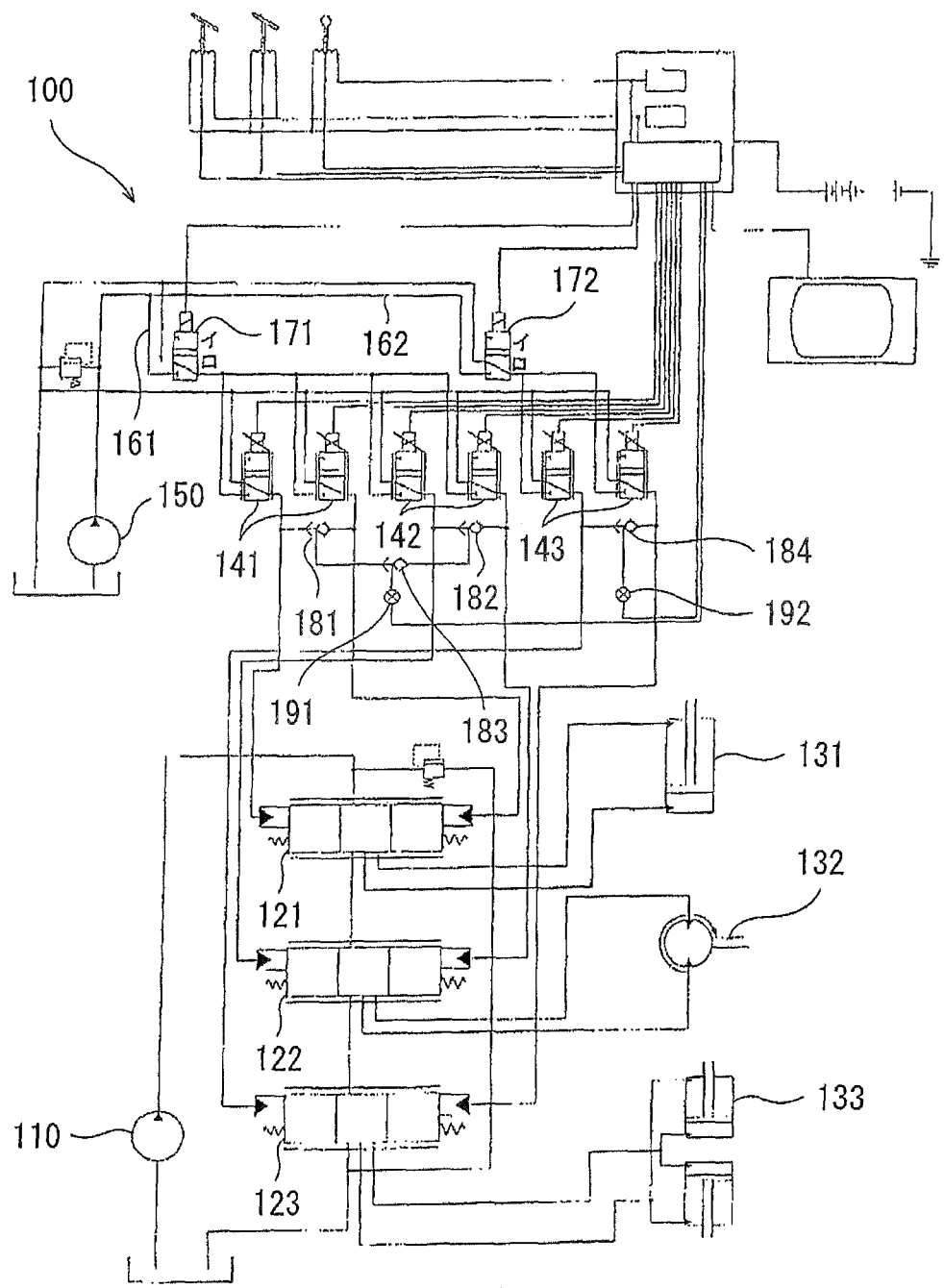
FIG. 9 is a circuit diagram of a conventional hydraulic drive system.

As shown in FIG. 8, similar to Embodiment 4, the boom auxiliary solenoid proportional valve 65 is provided for the boom auxiliary control valve 34. Similarly, although not illustrated, similar to Embodiment 4, arm auxiliary solenoid proportional valves are provided for the arm auxiliary control valve. The boom operation solenoid proportional valves 63, the arm auxiliary solenoid proportional valves (not shown), and the bucket operation solenoid proportional valves (not shown) are categorized as first solenoid proportional valves outputting pilot pressures to the first control valves. The boom auxiliary solenoid proportional valve 65, the turning operation solenoid proportional valves 64, and the arm operation solenoid proportional valves (not shown) are categorized as second solenoid proportional valves outputting pilot pressures to the second control valves.

The primary pressure line 5 includes: a first passage 56, which leads the hydraulic oil from the auxiliary pump 26 to the first solenoid proportional valves (the boom operation solenoid proportional valves 63, the unillustrated arm auxiliary solenoid proportional valves, and the unillustrated bucket operation solenoid proportional valves); a second passage 57, which leads the hydraulic oil from the auxiliary pump 26 to the second solenoid proportional valves (the boom auxiliary solenoid proportional valve 65, the turning operation solenoid proportional valves 64, and the unillustrated arm operation solenoid proportional valves); and a running operation passage 55, which leads the hydraulic oil from the auxiliary pump 26 to the first running operation solenoid proportional valves 61 and the second running operation solenoid proportional valves 62.

The upstream-side portion of the first passage 56 forms a passage that is shared with the upstream-side portion of the second passage 57 and with the upstream-side portion of the running operation passage 55. Each of the first passage 56, the second passage 57, and the running operation passage 55 includes one common passage and a plurality of distribution passages branching off from the common passage.

The common passage of the first passage 56 is provided with a first solenoid switching valve 87; the common passage of the second passage 57 is provided with a second solenoid switching valve 88; and the common passage of the running operation passage 55 is provided with a third solenoid switching valve 86. Each of the first solenoid switching valve 87, the second solenoid switching valve 88, and the third solenoid switching valve 86 is configured in the same manner as the solenoid switching valve 81 described in Embodiment 1. The first solenoid switching valve 87, the second solenoid switching valve 88, and the third solenoid switching valve 86 are controlled by the controller 9.

The aforementioned movement detection line 75 extends from the auxiliary pump 26 to the tank through the left running control valve 31 and the right running control valve 32. The upstream-side portion of the movement detection line 75 forms a passage shared with the primary pressure line 5. The movement detection line 75 may extend through the left running control valve 31 and the right running control valve 32 in any order. The movement detection line 75 is configured to be blocked when either the left running control valve 31 or the right running control valve 32 has moved. The movement detection line 75 is provided with a throttle 76 and a third pressure sensor (a movement detection pressure sensor) 95, which are disposed upstream of all the control valves on the movement detection line 75, such that the throttle 76 is positioned upstream of the third pressure sensor 95. The throttle 76 serves to secure the pressure of the primary pressure line 5 when all the control valves on the movement detection line 75 are in neutral.

Regarding the first solenoid switching valve 87, while any of the first operation devices is outputting an electrical signal indicating that its operating lever is not in neutral, the controller 9 feeds a driving current to the first solenoid switching valve 87. As a result, the first solenoid switching valve 87 opens the first passage 56. While all the first operation devices are outputting electrical signals indicating that their operating levers are in neutral, the controller 9 feeds a driving current to the first solenoid switching valve 87 if the measurement value of the first pressure sensor 93 is less than a first threshold $\gamma 1$. On the other hand, while all the first operation devices are outputting electrical signals indicating that their operating levers are in neutral, the controller 9 feeds no driving current to the first solenoid switching valve 87 if the measurement value of the first pressure sensor 93 is greater than the first threshold $\gamma 1$. As a result, the first solenoid switching valve 87 blocks the first passage 56.

Regarding the second solenoid switching valve 88, while any of the second operation devices is outputting an electrical signal indicating that its operating lever is not in neutral, the controller 9 feeds a driving current to the second solenoid switching valve 88. As a result, the second solenoid switching valve 88 opens the second passage 57. While all the second operation devices are outputting electrical signals indicating that their operating levers are in neutral, the controller 9 feeds a driving current to the second solenoid switching valve 88 if the measurement value of the second pressure sensor 94 is less than a second threshold $\gamma 2$. On the other hand, while all the second operation devices are outputting electrical signals indicating that their operating levers are in neutral, the controller 9 feeds no driving current to the second solenoid switching valve 88 if the measurement value of the second pressure sensor 94 is greater than the second threshold $\gamma 2$. As a result, the second solenoid switching valve 88 blocks the second passage 57. It should be noted that the second threshold $\gamma 2$ may be the same as or different from the first threshold $\gamma 1$.

Regarding the third solenoid switching valve 86, while either the first running operation device 41 or the second running operation device 42 is outputting an electrical signal indicating that its operating lever is not in neutral, the controller 9 feeds a driving current to the third solenoid switching valve 86. As a result, the third solenoid switching valve 86 opens the running operation passage 55. While both the first running operation device 41 and the second running operation device 42 are outputting electrical signals indicating that their operating levers are in neutral, the controller 9 feeds a driving current to the third solenoid switching valve 86 if the measurement value of the third pressure sensor 95 is less than a third threshold $\gamma 3$. On the other hand, while both the first running operation device 41 and the second running operation device 42 are outputting electrical signals indicating that their operating levers are in neutral, the controller 9 feeds no driving current to the third solenoid switching valve 86 if the measurement value of the third pressure sensor 95 is greater than the third threshold $\gamma 3$. As a result, the third solenoid switching valve 86 blocks the running operation passage 55. It should be noted that the third threshold $\gamma 3$ may be the same as or different from the first threshold $\gamma 1$ or the second threshold $\gamma 2$.

The present embodiment provides the same advantageous effects as those provided by Embodiment 3. Further, in the present embodiment, a failure in the first solenoid proportional valves, a failure in the second solenoid proportional valves, and a failure in the running operation solenoid proportional valves can be detected separately. In addition, even if a failure has occurred in the first solenoid proportional valves, the second solenoid proportional valves, or the running operation solenoid proportional valves, either the actuators supplied with the hydraulic oil from the first main pump 22 or the actuators supplied with the hydraulic oil from the second main pump 24 can be kept driven, or alternatively, either running actuators (i.e., the running motors) or non-running actuators can be kept driven.

Other Embodiments

The present invention is not limited to the above-described Embodiments 1 to 5. Various modifications can be made without departing from the spirit of the present invention.

For example, the hydraulic drive system according to the present invention is also applicable to construction machines different from hydraulic excavators. Moreover, the hydraulic drive system according to the present invention is applicable not only to construction machines but also to industrial machines.

From the foregoing description, numerous modifications and other embodiments of the present invention are obvious to a person skilled in the art. Therefore, the foregoing description should be interpreted only as an example and is provided for the purpose of teaching the best mode for carrying out the present invention to a person skilled in the art. The structural and/or functional details may be substantially altered without departing from the spirit of the present invention.

REFERENCE SIGNS LIST

1A to 1E hydraulic drive system
22 first main pump
23 first circulation line
24 second main pump
25 second circulation line
26 auxiliary pump
31 left running control valve (movement detection target control valve, first control valve)
32 right running control valve (movement detection target control valve, second control valve)
33 boom main control valve (movement detection target control valve, first control valve)
34 boom auxiliary control valve (second control valve)
35 turning control valve (movement detection target control valve, second control valve)
41 first running operation device (first operation device)
42 second running operation device (second operation device)
43 boom operation device (non-running operation device, first operation device, second operation device)
44 turning operation device (non-running operation device, second operation device)
5 primary pressure line
61, 62 running operation solenoid proportional valve
71 first movement detection line
73 second movement detection line
81 solenoid switching valve
82 first solenoid switching valve
83 second solenoid switching valve
84 first solenoid switching valve
85 second solenoid switching valve
86 third solenoid switching valve
87 first solenoid switching valve
88 second solenoid switching valve 91 first pressure sensor (movement detection pressure sensor)
92 second pressure sensor (movement detection pressure sensor)
93 first pressure sensor (discharge-pressure-measuring pressure sensor)
94 second pressure sensor (discharge-pressure-measuring pressure sensor)
95 third pressure sensor (movement detection pressure sensor)

What is claimed is:

1. A hydraulic drive system comprising:
a plurality of control valves disposed on a circulation line extending from a main pump to a tank;
a plurality of operation devices with which to operate the plurality of control valves, each operation device of the plurality of operation devices including an operating lever and outputting an electrical signal in accordance with an inclination angle of the operating lever;
a plurality of solenoid proportional valves that output pilot pressures to the plurality of control valves;
a controller that controls each solenoid proportional valve of the plurality of solenoid proportional valves based on the electrical signal outputted from a corresponding one of the plurality of operation devices;
a primary pressure line that leads hydraulic oil from an auxiliary pump to the plurality of solenoid proportional valves;
a solenoid switching valve provided on the primary pressure line;
a movement detection line that extends from the auxiliary pump to the tank through a plurality of movement detection target control valves among the plurality of control valves, the movement detection line being blocked when any one of the plurality of movement detection target control valves has moved; and
a movement detection pressure sensor provided on the movement detection line, wherein
the controller controls the solenoid switching valve while all of the plurality of operation devices are outputting electrical signals indicating that their respective operating levers are in neutral, such that:
the solenoid switching valve opens the primary pressure line if a measurement value of the pressure sensor is less than a threshold; and
the solenoid switching valve blocks the primary pressure line if the measurement value of the pressure sensor is greater than the threshold.

2. The hydraulic drive system according to claim 1, wherein
the hydraulic drive system is a hydraulic drive system of a self-propelled hydraulic excavator,
the circulation line includes a first circulation line and a second circulation line,
the main pump includes a first main pump and a second main pump,
the plurality of movement detection target control valves include:
a left running control valve disposed on the first circulation line extending from the first main pump to the tank;
a right running control valve disposed on the second circulation line extending from the second main pump to the tank; and
a plurality of non-running control valves, each of which is disposed either on the first circulation line or on the second circulation line, the plurality of operation devices include:
a plurality of running operation devices with which to operate the left running control valve and the right running control valve; and
a plurality of non-running operation devices with which to operate the plurality of non-running control valves,
the movement detection line includes:
a first movement detection line that extends from the auxiliary pump to the tank through the left running control valve and the right running control valve, the first movement detection line being blocked when either the left running control valve or the right running control valve has moved; and
a second movement detection line that extends from the auxiliary pump to the tank through the plurality of non-running control valves, the second movement detection line being blocked when any one of the plurality of non-running control valves has moved,
the plurality of solenoid proportional valves include:
a plurality of running operation solenoid proportional valves that output pilot pressures to the left running control valve and the right running control valve; and
a plurality of non-running operation solenoid proportional valves that output pilot pressures to the plurality of non-running control valves,
the primary pressure line includes:
a running operation passage that leads the hydraulic oil from the auxiliary pump to the plurality of running operation solenoid proportional valves; and
a non-running operation passage that leads the hydraulic oil from the auxiliary pump to the plurality of non-running operation solenoid proportional valves,
the solenoid switching valve includes a first solenoid switching valve provided on the running operation passage and a second solenoid switching valve provided on the non-running operation passage,
the movement detection pressure sensor includes a first pressure sensor provided on the first movement detection line and a second pressure sensor provided on the second movement detection line,
the measurement value includes a measurement value of the first pressure sensor and a measurement value of the second pressure sensor,
the threshold includes a first threshold and a second threshold,
the controller controls the first solenoid switching valve while all of the plurality of running operation devices are outputting electrical signals indicating that their operating levers are in neutral, such that:
the first solenoid switching valve opens the running operation passage if the measurement value of the first pressure sensor is less than the first threshold; and
the first solenoid switching valve blocks the running operation passage if the measurement value of the first pressure sensor is greater than the first threshold, and
the controller controls the second solenoid switching valve while all of the plurality of non-running operation devices are outputting electrical signals indicating that their operating levers are in neutral, such that:
the second solenoid switching valve opens the non-running operation passage if the measurement value of the second pressure sensor is less than the second threshold; and the second solenoid switching valve blocks the non-running operation passage if the measurement value of the second pressure sensor is greater than the second threshold.

3. The hydraulic drive system according to claim 1, wherein
the plurality of solenoid proportional valves are normally closed valves.

4. A hydraulic drive system comprising:
a plurality of control valves disposed on a circulation line extending from a main pump to a tank;
a plurality of operation devices with which to operate the plurality of control valves, each operation device of the plurality of operation devices including an operating lever and outputting an electrical signal in accordance with an inclination angle of the operating lever;
a plurality of solenoid proportional valves that output pilot pressures to the plurality of control valves;
a controller that controls each solenoid proportional valve of the plurality of solenoid proportional valves based on the electrical signal outputted from a corresponding one of the plurality of operation devices;
a primary pressure line that leads hydraulic oil from an auxiliary pump to the plurality of solenoid proportional valves;
a solenoid switching valve provided on the primary pressure line; and
a discharge-pressure-measuring pressure sensor provided on the circulation line, wherein
the controller controls the solenoid switching valve while all of the plurality of operation devices are outputting electrical signals indicating that their respective operating levers are in neutral, such that:
the solenoid switching valve opens the primary pressure line if a measurement value of the pressure sensor is less than a threshold; and
the solenoid switching valve blocks the primary pressure line if the measurement value of the pressure sensor is greater than the threshold.

5. The hydraulic drive system according to claim 4, wherein
the circulation line includes a first circulation line and a second circulation line,
the main pump includes a first main pump and a second main pump,
the plurality of control valves include:
a plurality of first control valves disposed on the first circulation line extending from the first main pump to the tank; and
a plurality of second control valves disposed on the second circulation line extending from the second main pump to the tank,
the plurality of operation devices include:
a plurality of first operation devices with which to operate the plurality of first control valves; and
a plurality of second operation devices with which to operate the plurality of second control valves,
the plurality of solenoid proportional valves include:
a plurality of first solenoid proportional valves that output pilot pressures to the plurality of first control valves; and
a plurality of second solenoid proportional valves that output pilot pressures to the plurality of second control valves,
the primary pressure line includes:
a first passage that leads the hydraulic oil from the auxiliary pump to the plurality of first solenoid proportional valves; and
a second passage that leads the hydraulic oil from the auxiliary pump to the plurality of second solenoid proportional valves,
the solenoid switching valve includes a first solenoid switching valve provided on the first passage and a second solenoid switching valve provided on the second passage,
the discharge-pressure-measuring pressure sensor includes a first pressure sensor provided on the first circulation line and a second pressure sensor provided on the second circulation line,
the measurement value includes a measurement value of the first pressure sensor and a measurement value of the second pressure sensor,
the threshold includes a first threshold and a second threshold,
the controller controls the first solenoid switching valve while all of the plurality of first operation devices are outputting electrical signals indicating that their operating levers are in neutral, such that:
the first solenoid switching valve opens the first passage if the measurement value of the first pressure sensor is less than the first threshold; and
the first solenoid switching valve blocks the first passage if the measurement value of the first pressure sensor is greater than the first threshold, and
the controller controls the second solenoid switching valve while all of the plurality of second operation devices are outputting electrical signals indicating that their operating levers are in neutral, such that:
the second solenoid switching valve opens the second passage if the measurement value of the second pressure sensor is less than the second threshold; and
the second solenoid switching valve blocks the second passage if the measurement value of the second pressure sensor is greater than the second threshold.

6. The hydraulic drive system according to claim 4, wherein
the hydraulic drive system is a hydraulic drive system of a self-propelled hydraulic excavator,
the circulation line includes a first circulation line and a second circulation line,
the main pump includes a first main pump and a second main pump,
the plurality of control valves include:
a left running control valve disposed on the first circulation line extending from the first main pump to the tank;
a right running control valve disposed on the second circulation line extending from the second main pump to the tank;
a plurality of first control valves that are control valves disposed on the first circulation line other than the left running control valve; and
a plurality of second control valves that are control valves disposed on the second circulation line other than the right running control valve,
the plurality of operation devices include:
a plurality of first operation devices with which to operate the plurality of first control valves;
a plurality of second operation devices with which to operate the plurality of second control valves; and a plurality of running operation devices with which to operate the left running control valve and the right running control valve, the plurality of solenoid proportional valves include:
- a plurality of first solenoid proportional valves that output pilot pressures to the plurality of first control valves;
- a plurality of second solenoid proportional valves that output pilot pressures to the plurality of second control valves; and
- a plurality of running operation solenoid proportional valves that output pilot pressures to the left running control valve and the right running control valve, the primary pressure line includes:
- a first passage that leads the hydraulic oil from the auxiliary pump to the plurality of first solenoid proportional valves;
- a second passage that leads the hydraulic oil from the auxiliary pump to the plurality of second solenoid proportional valves; and
- a running operation passage that leads the hydraulic oil from the auxiliary pump to the plurality of running operation solenoid proportional valves, the solenoid switching valve includes a first solenoid switching valve provided on the first passage, a second solenoid switching valve provided on the second passage, and a third solenoid switching valve provided on the running operation passage, the discharge-pressure-measuring pressure sensor includes a first pressure sensor provided on the first circulation line and a second pressure sensor provided on the second circulation line, the hydraulic drive system comprises:
- a movement detection line that extends from the auxiliary pump to the tank through the left running control valve and the right running control valve, the movement detection line being blocked when either the left running control valve or the right running control valve has moved; and
- a third pressure sensor provided on the movement detection line, the measurement value includes a measurement value of the first pressure sensor and a measurement value of the second pressure sensor, the threshold includes a first threshold and a second threshold, the controller controls the first solenoid switching valve while all of the plurality of first operation devices are outputting electrical signals indicating that their operating levers are in neutral, such that:
- the first solenoid switching valve opens the first passage if the measurement value of the first pressure sensor is less than the first threshold; and
- the first solenoid switching valve blocks the first passage if the measurement value of the first pressure sensor is greater than the first threshold, the controller controls the second solenoid switching valve while all of the plurality of second operation devices are outputting electrical signals indicating that their operating levers are in neutral, such that:
- the second solenoid switching valve opens the second passage if the measurement value of the second pressure sensor is less than the second threshold; and
- the second solenoid switching valve blocks the second passage if the measurement value of the second pressure sensor is greater than the second threshold, and the controller controls the third solenoid switching valve while all of the plurality of running operation devices are outputting electrical signals indicating that their operating levers are in neutral, such that:
- the third solenoid switching valve opens the running operation passage if a measurement value of the third pressure sensor is less than a third threshold; and
- the third solenoid switching valve blocks the running operation passage if the measurement value of the third pressure sensor is greater than the third threshold.

7. The hydraulic drive system according to claim 4, wherein
the plurality of solenoid proportional valves are normally closed valves.

* * * * *